Patented July 25, 1933

1,919,297

UNITED STATES PATENT OFFICE

WALTER KROPP, FRITZ LANGE, AND ARNOLD BOHNE, OF ELBERFELD, GERMANY, ASSIGNORS TO WINTHROP CHEMICAL COMPANY, INC., OF NEW YORK, N. Y., A CORPORATION OF NEW YORK

VITAMIN PREPARATIONS CONTAINING LIPOID SOLUBLE VITAMINS

No Drawing. Application filed September 28, 1929, Serial No. 395,996, and in Germany October 22, 1928.

The present invention relates to new vitamin preparations containing lipoid soluble vitamins.

Stable solutions in oil of the lipoid soluble vitamins are known. These solutions, however, can only be mixed with difficulty with water or aqueous solutions or emulsions, such as sirups, milk and the like with the result that administration in this form frequently offers difficulties.

In accordance with the present invention stable vitamin solutions containing the lipoid soluble vitamins A and D, which do not display these disadvantages, are obtainable by employing as solvent a liquid water soluble derivative of a polyvalent alcohol of the group consisting of ethers and esters thereof and liquid water-soluble amides of the lower fatty acids, such as glycol-alkyl-ethers, glycerine - dimethylether, glycerine - diethylether, acetic acid glycerine-ester, acetamide, formamide, N-ethylacetamide, diethylacetamide, propionylamide and the like. Also mixtures of two or more of these compounds are operable and therefore within the scope of our invention. Obviously it is not necessary in this latter case that each single component of the mixture is liquid, the mixture as a whole being liquid would be sufficient.

On dilution with water or aqueous solutions or emulsions, for example, sirups, milk, soups and the like, the vitamins are precipitated from their solutions in an extremely finely divided emulsion-like state, in which they can conveniently be taken. In view of the great instability of the vitamins it is worthy of note that the new solutions retain their efficacy.

The invention is illustrated by the following examples without being restricted thereto:

*Example 1.*—10 parts by weight of a vitamin D preparation, obtained by exposing ergosteral to ultra-violet rays, are dissolved in 100 parts by weight of cold ethyleneglycolmonoethylether. The completely clear solution yields, when dropped into a substantial excess of water, an opaque cloudiness, which persists without flocculation for a prolonged period.

*Example 2.*—10 parts by weight of the vitamin preparation of Example 1 are dissolved in 100 parts by weight of cold glycerine-diethylether. Such a solution likewise displays excellent dispersion properties in water.

*Example 3.*—1 part by weight of the vitamin D preparation of Example 1 is dissolved in 100 parts by weight of acetic acid glycerine ester and on dilution with water or an aqueous liquid, for example milk, sirups, or the like, very fine emulsions are likewise obtained.

*Example 4.*—5 parts by weight of the vitamin preparation of Example 1 are dissolved in 100 parts by weight of cold N-ethylacetamide. The solution is quite clear and when dropped into a large excess of water yields a milky clouded solution. Also when dropped into milk a very fine emulsion is likewise obtained.

*Example 5.*—4 parts by weight of the vitamin preparation of Example 1 are dissolved in a cold mixture of 48 parts by weight of N-ethylacetamide and 48 parts by weight of N-methylacetamide.

*Example 6.*—1 part by weight of the vitamin preparation of Example 1 is dissolved in a cold mixture of 2 parts by weight of acetamide, 8 parts by weight of N-ethylacetamide, and 10 parts by weight of N-methylacetamide.

Instead of N-ethylacetamide other amides of fatty acids, such as formamide, diethylacetamide or also mixtures of such with glycolmonoethylether, glycerine-diethylether and the like can be used. Also instead of the vitamin preparations of the examples other vitamin D preparations as they are obtainable, for instance, from the different varieties of yeast according to known methods may be applied with a similar result.

*Example 7.*—2 parts by weight of a vitamin A preparation (obtainable from cod liver oil or egg-yolk oil, for example, by saponifying with alkalies and extracting the unsaponifiable substance by means of an organic solvent) are dissolved in 100 parts by weight of N-ethylacetamide while heating up to about 40° C. Also this solution displays excellent dispersion properties in water or other aqueous solutions or emulsions, such as sirups, milk and the like.

We claim:

1. A stable vitamin preparation being a solution of a lipoid-soluble vitamin preparation in a water-soluble liquid amide of the lower fatty acids.

2. A stable vitamin preparation being a solution of a vitamin D preparation in a water-soluble liquid amide of the lower fatty acids.

3. A stable vitamin preparation being a solution of antirachitically activated ergosterol in a liquid water-soluble N-alkylated amide of a lower fatty acid.

4. A stable vitamin preparation consisting of a solution of antirachitically activated ergosterol in N-ethylacetamide.

5. A stable vitamin preparation consisting of a solution of antirachitically activated ergosterol in a mixture of N-methylacetamide and N-ethylacetamide.

6. A stable vitamin preparation consisting of a solution of antirachitically activated ergosterol in a mixture of acetamide, N-ethylacetamide and N-methylacetamide.

WALTER KROPP.
FRITZ LANGE.
ARNOLD BOHNE.